US005586785A

United States Patent [19]
Warner et al.

[11] Patent Number: 5,586,785
[45] Date of Patent: Dec. 24, 1996

[54] VEHICLE WIRE CUTTER

[75] Inventors: Joseph G. Warner, Sterling Heights; Christopher J. Bensch, Livonia, both of Mich.

[73] Assignee: The United States of America as represented by the Secretary of the Army, Washington, D.C.

[21] Appl. No.: 540,362

[22] Filed: Oct. 6, 1995

[51] Int. Cl.⁶ .............................. B60R 19/00; B60R 21/00
[52] U.S. Cl. .............................. 280/762; 83/928
[58] Field of Search .............................. 83/928, 639.4; 280/762; 180/184, 190, 186

[56] References Cited

U.S. PATENT DOCUMENTS

| | | | |
|---|---|---|---|
| 1,614,856 | 1/1927 | Overbeck, Jr. | 280/762 |
| 3,704,031 | 11/1972 | Confer | 280/762 |
| 3,724,579 | 4/1973 | Albertson | 83/928 |
| 3,743,316 | 7/1973 | Stotesbery | 280/762 |
| 3,770,293 | 11/1973 | Anderson | 280/762 |
| 3,841,656 | 10/1974 | Kramb et al. | 280/762 |
| 4,826,103 | 5/1989 | McKown | 83/639.4 |
| 5,308,114 | 5/1994 | Williams et al. | 280/762 |

*Primary Examiner*—Kenneth E. Peterson
*Assistant Examiner*—Sean A. Pryor
*Attorney, Agent, or Firm*—Peter A. Taucher; Gail S. Soderling

[57] ABSTRACT

The invention provides a structure mounted on the front of a vehicle to counteract wire booby traps set to disable vehicle drivers. The wire cutter has an upright cutting bar mounted on the front of a vehicle and a second cutting bar extending back from the first cutting bar at an angle. The second cutting bar has a cutting hook attached to the end so as to catch and sever any wire which remains uncut when the end of the second bar is reached.

1 Claim, 2 Drawing Sheets

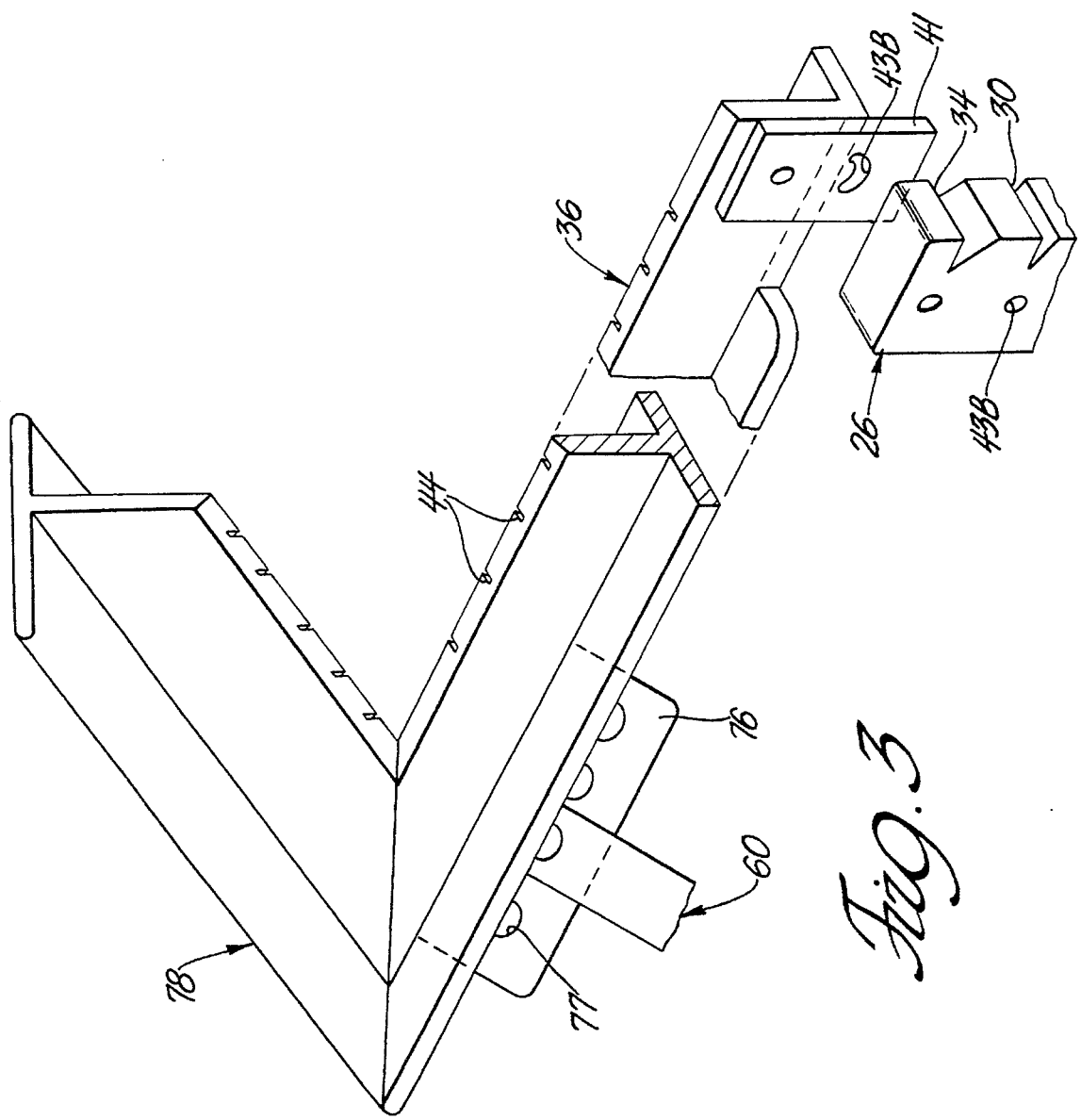

VEHICLE WIRE CUTTER

GOVERNMENT INTEREST

The invention described herein may be manufactured, used and licensed by or for the Government for governmental purposes without payment to me of any royalty.

BACKGROUND OF THE INVENTION

1. Field of the Invention

In one aspect this invention relates to military vehicle protection devices. In yet a further aspect, this invention relates to a device mountable on a vehicle to remove wires or cables from a vehicles path.

2. Prior Art

Military vehicles come in various sizes and configurations. In addition they operate under a wide variety of environments. Enemy forces frequently will string wire or thin wire rope across a trail or road to disable a vehicle or place a wire in a position which will contact and disable a driver when the vehicle is traversing a path.

In order to protect the driver and passengers a means for disabling the wire booby traps is required in hostile environments. Various structures have been used one example being placing an upright bar at the front of the vehicle with an arm at the upper end which points away from the vehicle in the direction of vehicle travel to keep the wire from sliding over the top of the bar and to try and break the wire. Such a device where the force of the wire against the vehicle is essentially normal to the upright bar results in a large normal force being applied to the upright bar. The vehicle momentum is generally sufficient to break most wires but the bar is subjected to a substantial shock force which in turn will create a large breaking force on the mounting bracketry attaching the bar to the vehicle. Also, generally each device will be designed to fit one vehicle and functions haphazardly. It would be desirable to have a protection kit which could be adapted to a variety of vehicles and has improved wire cutting and disabling structure. The kit should be strong, simple, fit a variety of vehicles and be readily installed using the simple tools normally available to a soldier under combat conditions. It is further desired that the device provide the ability to sever most wires without subjecting the cutter and vehicle to shock loading to improve the service life of the device and its mounting hardware.

BRIEF SUMMARY OF THE INVENTION

Briefly, the problems of the prior an are overcome using a wire cutter of the present invention. The wire cutter has a bracket adapted to be mounted to the front of the vehicle to be protected with a channel formed in the bracket. The wire cutter has a first vertically extending cutting bar with its first end attached to and mounted within the bracket and a second end extending vertically upward from the bracket to a location above the hood of the vehicle. The first cutting bar has a plurality of serrations on the face of the bar facing away from the vehicle. The first cutting bar has a mounting bracket located on the second end of the bar opposite the mounting bracket attached to the vehicle.

A second cutting bar has its first end rotatably mounted to the first vertical cutting bar and extends from the first cutting bar towards the vehicle making an acute angle to the direction of travel of the vehicle. The second cutting bar has a cutting hook mounted on the end opposite the first cutting bar, the hook being disposed at an acute angle to the second cutting bar and having a beveled edge adapted to engage and sever the wire. There is a boss mounted on the vehicle juxtaposed the passenger compartment to be protected with a support arm having one end attached to the boss and the other end attached to the second cutting bar. The support arm is attached to the second cutting bar at a location between the ends of the second cutting bar so the second cutting bar is held at an acute angle to the longitudinal axis of the vehicle.

When the cutting bar of the present invention makes contact with a wire to be severed, the wire will traverse the cuttings bar's serrated edge. The bar's acute angle to the direction of travel has a low normal stress component on the second cutting bar as the wire traverses the cutting edge of the second cutting bar to weaken the wire, and any wire hitting the hook unsevered, will be subjected to a large shock force normal to the vehicle longitudinal axis severing the wire.

BRIEF DESCRIPTION OF THE DRAWING

In the accompanying drawing:

FIG. 3 is a perspective view of a second cutting hook structure according to this invention.

DETAILED DESCRIPTION OF PREFERRED EMBODIMENTS

Figure 1:
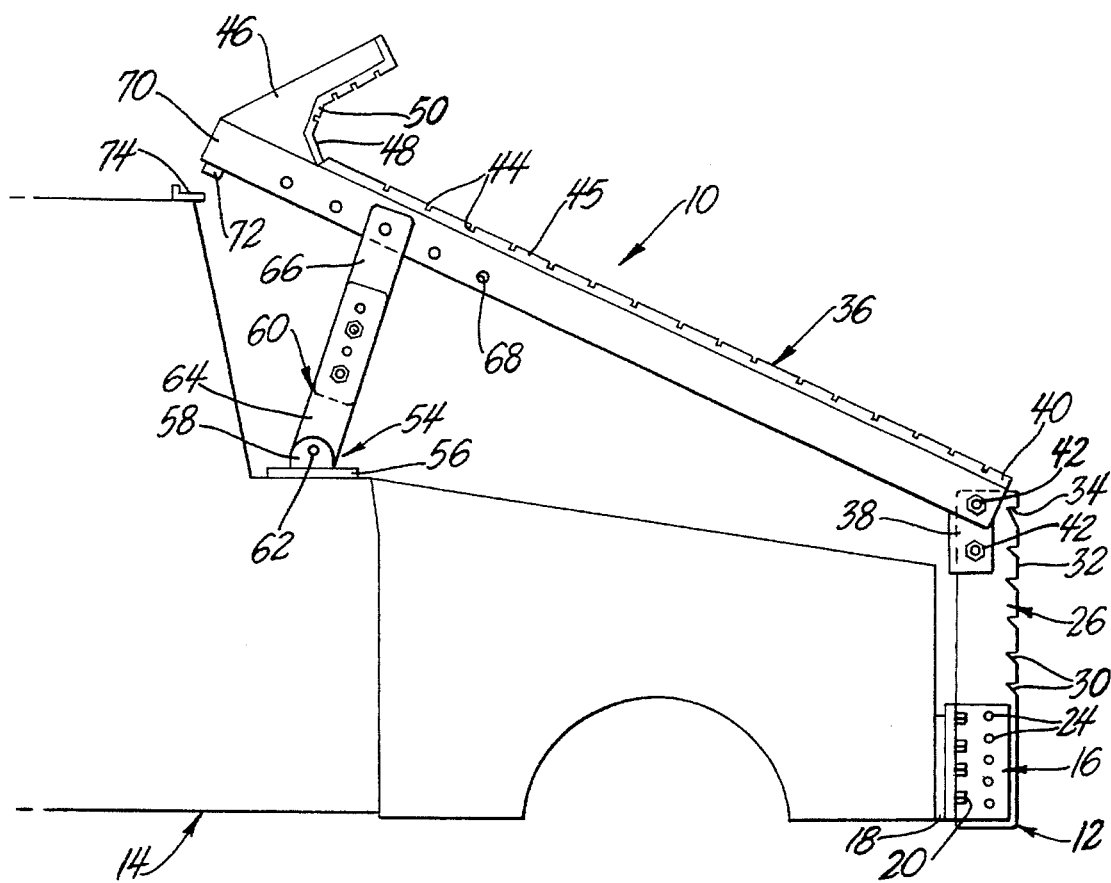
FIG. 1 is a side view of one embodiment of this invention.
Figure 2:
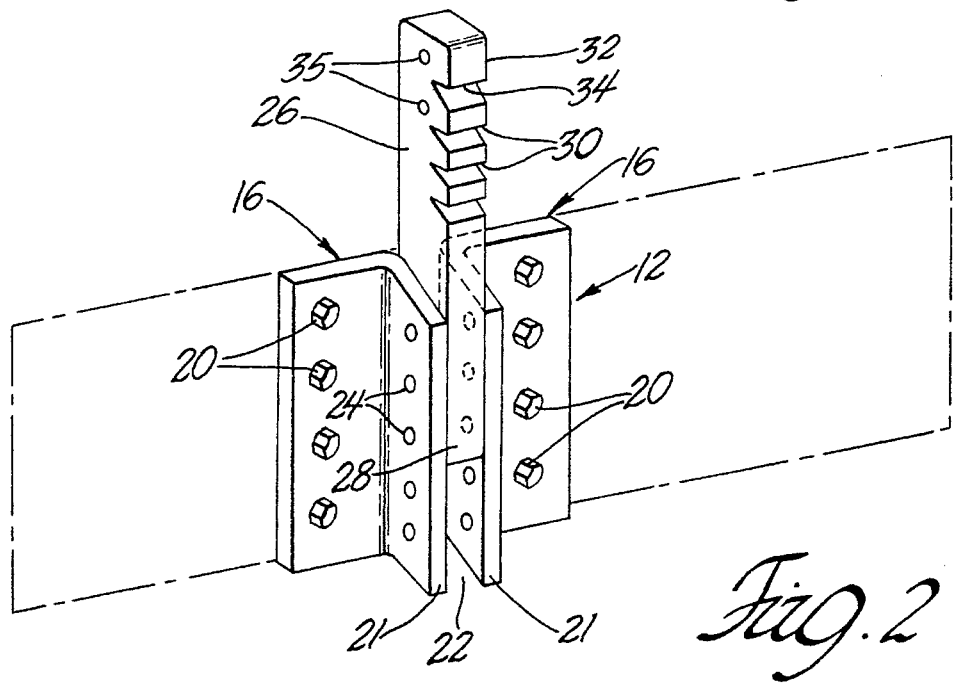
FIG. 2 is perspective view of a mounting bracket according to this invention.

Referring to the accompanying drawing where like numerals refer to like parts, in FIG. 1a vehicle 14 has a wire cutter according to this invention designated generally 10 mounted on the front of the vehicle. The wire cutter 10 has a mounting bracket designated generally 12 attached to the front of the vehicle 14. The mounting bracket 12 of FIG. 1 is shown in greater detail in FIG. 2. The mounting bracket 14 comprises complimentary right angle bracket members 16 which are mounted to the vehicle bumper 18 by fastening means such as the bolts 20 which pass through one or more of a series of apextures in one arm of the right angle bracket and complimentary apertures (not shown) in the bumper 18. The bolts 20 are held in place with mating nuts not shown such fasteners being within the skill of the art. Other fastening means such as rivets or weldments could also be used to permanently mount the brackets to the bumper if this is deemed desirable. The brackets 16 are mounted in spaced relationship with their free arms 21 in a spaced parallel relationship so as to form a channel 22 therebetween. Each of the free arms 21 has a plurality of spaced apertures 24 located in alignment for the purpose of mounting a first cutting bar 26.

A first end of cutting bar 26 having a plurality of apertures with the same spacing as the apertures 24 is inserted into channel 22 and securely fastened to the bracket 12. The first cutting bar 16 has a first end 28 held and supported within the mounting bracket 14 by two or more threaded fasteners or push pin/threaded fastener combination, the fasteners not being shown for clarity, which extend through a series of apertures 24 in the free arms 21 of the mounting bracket 12 and corresponding apertures in the first end 28 of the first cutting bar. Generally two or more fasteners such as ½ inch bolts provide sufficient strength to securely mount the first cutting bar 26 within the bracket 12 and maintain the first cutting bar in an upright position extending essentially vertically upward with respect to the vehicle 14. The two fasteners also form a pivot/lock combination allowing the unit to swing forward for easy maintenance. A plurality of notches 30 are formed on one face of the first cutting bar to create a first serrated cutting face 32 on the leading edge of the first cutting bar 26. The leading edge of the first cutting bar 26 will generally be the first portion of the wire cutter 10 which contacts an obstacle placed across the vehicle's path. As shown there is a larger sized, exaggerated cutting notch 34 at the second end of the first cutting bar opposite the mounting bracket. The exaggerated notch 34 provides a stronger than average force to the wire contacted by the first cutting bar 26 as the wire slides up on the bar as the vehicle moves forward. The upper edge or lip of the exaggerated notch and indeed all the notches could have reduced sections at their upper surfaces providing a sharpened cutting edge. The second, uppermost, end of the first cutting bar has apertures 35 formed therein to allow the attachment of a second cutting bar 36.

Referring again to FIG. 1, the second cutting bar 36 has a bracket 38 mounted on its first end 40 for attachment to the upper end of the first cutting bar 26. As shown the bracket 38 is a metal channel welded to the end of the second cutting bar 36. The bracket 38 shown is a short projection such as mild steel plate welded to the end of the second cutting bar at an obtuse angle with an aperture formed therein and there is a second aperture formed in the cutting bar itself. The apertures are spaced and aligned so as to correspond to complimentary apertures 35 formed in the first cutting bar 26. The cutter is mounted to the first vertical cutting bar 26 by passing two threaded fasteners through apertures in the bracket and the apertures 35 in the upper end of the first cutting bar 26. The second cutting bar 36 of FIG. 1 is made from a flat piece of metal material such as ¾ inch thick by 1 ½ inch wide steel stock. The second cutting bar 36 could have the out facing, cutting edge, reduced in thickness to form a cutting surface 45 or in the alternative could have a second piece of material such as a sharpened piece of a higher carbon or alloy steel permanently fastened to the cutting bar to provide an improved cutting action. The cutting edge has a plurality of notches 44 along the cutting edge to form a serrated facing providing a better cutting action.

The second cutting bar 36 has a cutting hook 46 mounted on the second, free, end of the second cutting bar 36 distal to the bracket 38 mounting the second cutting bar to the first cutting bar 26. The hook 46 shown in FIG. 1 has an initial hook cutting surface 48 disposed at an obtuse angle to receive a wire as it enters the hook from the cutting surface of second cutting bar 36. The wire then contacts a second hook surface 50 which is nominally orthogonal to the cutting edge 45 of second cutting bar 36. Finally any unsevered wire will contact a third hook cutting edge not shown which is disposed at an acute angle to second cutting bar 36. Any wire hitting the hook will be subjected to a large normal force which will sever all but the thickest and strongest wire ropes and cables such cables not being suitable for use as a booby trap in any event.

The second cutting bar 36 must be a relatively long arm in order to reach from the front bumper to a location near the driver's compartment. Thus a means of support is necessary to keep the second cutting bar 36 in position when it is acting upon a wire to be severed. If there was no intermediate support, the second cutting bar 36 would be cantilevered from the front bumper and as such would be easily deformed since cantilevered structures inherently flex more than triangular supports. Constructing a cantilevered cutting bar would require a massive supporting structure at the attachment to the first cutting bar and the bar itself would have to be considerably stronger in order to stand the shock forces placed on the bar by the wire to be cut. FIG. 1 shows one support means useful in the practice of this invention. A boss 54 is mounted on the vehicle juxtaposed the passenger compartment to be protected. The boss 54 has a flat plate 56 rigidly attached to vehicle 14 and a pair of semicircular projections 58 extending upward from plate 56. The projections 58 have apertures therein and a journal 62 mounted in the apertures to which one end of a support arm 60 is attached.

The support arm 60 as shown has two bars 64 and 66 with a plurality of apertures formed along the longitudinal axis of the bars the apertures being complimentary so that two or mores fasteners can be passed through complimentary apertures in the bars to join their ends. Bar 64 has one end held within the space between the projections 58 by journal 62 to and its other end attached to bar 66. Bar 66 has the end opposite bar 64 attached to the second cutting bar 36 at a position between the hook 46 and the bracket 38. The attachment to second cutting bar 36 can be by means of threaded fasteners or similar fastening means. As shown, there are a number of apertures 68 allowing the support arm 60 to be placed at a numbers of settings. this allows the cutting bar to be used with a number of different vehicles or in the alternative, the second cutting bar can be disposed at a number of different angels to provide different incident acute angles.

Free end 70 of second cutting bar 36 will generally be near the roof line of the vehicle's passenger compartment. A block 72 can be mounted on the free end and disposed so as to engage a complimentary seat 74 attached to the roof. If desired, the block 72 and the boss 74 can be used to compliment the support bar in maintaining the second cutting bar in position or in some circumstances could be used without a support bar to maintain the cutting bar 36 at the desired angle.

Referring to FIG. 3, a second embodiment of the hook and cutting bar combination is shown combined with a modification to the mounting racket allowing further adjustment. The mounting method of FIG. 3 could also be incorporated into the design of FIG. 1. In FIG. 3, the hook and cutting bar are formed from T-bar stock. In this alternate configuration, the second cutting bar 36 has a small plate 41 fastened to the end of the small plate 41 the plate having a arcuate opening 43B formed to cooperate with the lower of the two apertures formed in the first cutting bar 26. The arcuate opening allows the second cutting bar to be rotated into position providing greater adjustability. The two fasteners 42 hold the second cutting bar in position as set forth with respect to FIG. 1. The web portion of the T-bar is sharpened and notched as described before with respect to the second cutting bar of FIG. 1. A bracket 76 having a plurality of apertures 78 formed therein is welded to the cross bar of the T-bar to be used in attaching the support bar 60 to the vehicle. The hook in this view is formed by a sharpened piece of T-bar 78 welded to the free end of the second cutting bar at an acute angle. In this configuration, the second cutting bar will make contact with a wire to be severed at an angle which provides a reduced normal stress on the second cutting bar the wire traverses the cutting edge of the second cutting bar to weaken the wire, and will create a large normal force as the arm 78 is struck.

Various modifications and alterations will become apparent to those skilled in the art with out departing from the scope and spirit of this invention and it is understood that this invention is not limited to the illustrative embodiments set forth above.

What is claimed is:

1. A wire cutter adapted for installation on a vehicle to sever and protect it from a wire disposed transversely to the direction of vehicle travel, comprising a first bracket adapted to be mounted to the front of the vehicle to be protected, the first bracket having a channel formed therein; a first vertically extending cutting bar having a first end adapted to be attached to and mounted within the channel formed in the first bracket the first cutting bar having a plurality of serrations on a front face of the first cutting bar, the first cutting bar has a second mounting bracket located on a second end of the bar opposite the first bracket; a second cutting bar having a first end rotatably mounted to the first vertical cutting bar; a cutting hook mounted on a second end of the second cutting bar, the hook being disposed at an acute angle to the second cutting bar and having a beveled edge adapted to engage and sever the wire; a boss mounted on the vehicle juxtaposed a passenger compartment to be protected; an adjustable length support arm having one end attached to the boss and another end attached to the second cutting bar at a location between the ends of the second cutting bar, the support arm length being chosen so as to hold the second cutting bar at an adjustable acute angle to a longitudinal axis of the vehicle; whereby the second cutting bar will make contact with a wire to be severed at an angle which provides a reduced normal stress on the second cutting bar as the wire traverses a cutting edge of the second cutting bar to weaken the wire, and wire hitting the hook will be subjected to a large normal force severing the wire.

* * * * *